United States Patent
Schill et al.

(10) Patent No.: US 7,833,563 B2
(45) Date of Patent: Nov. 16, 2010

(54) INDUSTRIAL PRODUCTION OF INTERMEDIATE FOOD PRODUCT (I.F.P.) BASED ON FISH FLESH AND PACKAGED I.F.P.S. THUS PRODUCED

(75) Inventors: Robert Schill, Hayange-Marspich (FR); Jean-Vincent Chantreau, Granville (FR)

(73) Assignees: La Patrimoniale Schill (FR); La Patrimoniale Chantreau (FR)

( * ) Notice: Subject to any disclaimer, the term of this patent is extended or adjusted under 35 U.S.C. 154(b) by 1359 days.

(21) Appl. No.: 10/509,294

(22) PCT Filed: Mar. 25, 2003

(86) PCT No.: PCT/FR03/00933

§ 371 (c)(1), (2), (4) Date: Sep. 23, 2004

(87) PCT Pub. No.: WO03/079820

PCT Pub. Date: Oct. 2, 2003

(65) Prior Publication Data

US 2005/0142279 A1 Jun. 30, 2005

(30) Foreign Application Priority Data

Mar. 26, 2002 (FR) .................................. 02 03716

(51) Int. Cl.
*A23L 1/325* (2006.01)
(52) U.S. Cl. .................................................... 426/643
(58) Field of Classification Search .................. 426/643
See application file for complete search history.

(56) References Cited

U.S. PATENT DOCUMENTS 5,436,024 A * 7/1995 Rogols ........................ 426/643
6,005,073 A * 12/1999 Hultin et al. ................. 530/350

FOREIGN PATENT DOCUMENTS

FR 2 651 967 3/1991

(Continued)

OTHER PUBLICATIONS

Van Zile, "Surimi Processing" in Seafood Buisness, Dec. 2002, p. 1-6.*

(Continued)

*Primary Examiner*—Keith D Hendricks
*Assistant Examiner*—Elizabeth Gwartney
(74) *Attorney, Agent, or Firm*—Cantor Colburn LLP

(57) ABSTRACT

The invention relates to the production of hydrated concentrates of myofibrillar proteins from fish flesh which are commonly known as surimi-base or, more generally, intermediate food products (I.F.P.). The inventive production method comprises the following successive steps: (1) initial minced fish flesh is prepared from fish fillets; (2) said initial mince is washed with water until a washed mince is obtained which contains a residual fraction of sarcoplasmic proteins and lipids of between 0.1 and 3% of the weight of the mince; (3) while wet, the washed mince is refined by eliminating a fraction of impurities; (4) the refined mince is mixed until an even emulsion mince is produced; (6) the emulsified mince is drained so as to produce a densified mince; (7) cryoprotectants are then added to the densified mince in order to form a final freezable mince; (8) the final mince is packed in nutrient plates; and (9) said plates are frozen. In this way, a quality I.F.P is obtained with a significantly increased production yield in relation to the prior art, particularly for fatty fish.

11 Claims, 3 Drawing Sheets

FOREIGN PATENT DOCUMENTS

| | | |
|---|---|---|
| FR | 2 702 127 | 9/1994 |
| WO | WO 0162888 * | 8/2001 |

OTHER PUBLICATIONS

International Search Report; PCT/FR03/00933; Aug. 14, 2003.

Kelleher S D et al; "Stability of mackerel surimi prepared under lipid-stabilizing processing conditions"; Journal of Food Science 1994 Univ. of Massachusetts, Marine Sta., vol. 59 No. 2, pp. 269-271, XP002226711, p. 269, col. 1-col. 2, paragraph 1.

Ching L H et al.; "Progres recents dans la recuperation des proteines myofibrillaires par la technologie de preparation de surimi"; Sciences Des Aliments 1993 Ifremer, Cent. De Nantes, Rue De L'ile D'Yeu, 44037 Nantes Cedex 01, France, vol. 13, No. 2, pp. 229-236, XP008012311.

* cited by examiner

INDUSTRIAL PRODUCTION OF INTERMEDIATE FOOD PRODUCT (I.F.P.) BASED ON FISH FLESH AND PACKAGED I.F.P.S. THUS PRODUCED

TECHNICAL FIELD OF INVENTION

The invention relates to the field of the food industry and more particularly to the field of the production of surimi-base and other analogous intermediate food products (IFPs) prepared from fish flesh.

BRIEF DESCRIPTION OF THE RELATED ART

It is noted that surimi-base is a generic term for a hydrated concentrate of myofibrillar proteins which is obtained from fish flesh that has been minced, washed, strained and centrifuged several times to produce a protein gel used in the manufacture of kamaboko and other derived products.

The traditional process for the manufacture of surimi-base has existed since the 15th century and various improvements have been made to this basic technology, either to improve the production yields or to improve the physical characteristics (gelling strength, whiteness, elasticity, stability) of the product.

Irrespective of the methods described below, the inventors' objective was always to perfect the methods of separating and extracting the myofibrillar proteins from fish flesh, said proteins alone being responsible for the quality of the surimi-base, and to optimize the removal of the pro-oxidizing or denaturing agents.

It should actually be stated that although the myofibrillar proteins alone are responsible for the desired qualities of the surimi-base, the other substances naturally present in fish flesh, for example the lipids and the sarcoplasmic proteins, modify the functional properties of the myofibrillar proteins and cause a denaturation of the finished product (surimi-base).

Surimi-base is currently prepared mainly from "lean" or "white" fish, such as hake, coalie or whiting, essentially because their tissues contain a high proportion of "white" muscles rich in myofibrillar proteins and a low proportion of "red" muscles rich in lipids and pro-oxidizing elements.

These "white" fish, which are sought not only for the production of surimi-base but also for traditional uses (whole or as fillets, fresh or frozen) and whose exploitable stocks have long renewal dynamics, are very often overexploited and subjected to catch quotas. These established bioeconomic facts have a significant effect on the costs of accessing the resource, resulting in seasonal speculations that are rather inappropriate for a long-term industrial business strategy.

On the other hand, so-called "oily" fish, such as scad, sardine or mackerel, contain a high proportion of "red" muscles and lipids, making them difficult to use for the production of surimi-base for the reasons referred to above.

Attempts have nevertheless been made to use these "oily" fish in the surimi-base industry because of their abundance, the fast rate of renewal of their exploitable stocks, and their low commercial value.

However, converting the known processes for the manufacture of surimi-base from "lean" fish to "oily" fish requires that the flesh be washed and refined more thoroughly to remove the excess lipids, pigments and sarcoplasmic proteins. These successive operations cause significant losses of production yield and consequently result in a low economic viability.

Secondly, and as a general principle, the processes known or proposed hitherto for the manufacture of surimi-base take no account of the specific characteristics of the raw material, namely the fish. Now, important variations in the biochemical composition of the fish flesh are observed according to the species fished, the fishing season and the method of catching and storing the fish before treatment, and these variations cause fluctuations in the quality of the finished product (surimi-base). On the whole, the quality of a surimi-base for a given process is directly dependent on the specific characteristics of the fish from which this surimi is manufactured.

Thus, in a first existing process, the headed, gutted and filleted fish are introduced manually between two drums, one of which is in the form of a screen (sieve) enabling the muscle tissues to be separated from the bones and the epidermal tissues as a function of a pressure gradient.

The pulp obtained contains variable proportions of sarcoplasmic proteins, myofibrillar proteins, connective tissue proteins, lipids and diverse impurities.

This crude pulp is then subjected to a series of washes with water, followed by centrifugations, to remove the soluble proteins and the lipids.

The third step of this process consists in pressing the pulp to remove the excess water and produce a pulp with a water content of about 80%.

The fourth step consists of a refining phase aimed at removing the connective tissues contained in the pulp. The refining is performed dry in this process. The product is subsequently shaped into blocks and then frozen after being mixed with various cryoprotectants.

A second process for the manufacture of surimi-base comprises continuous washing of the pulp, followed by centrifugal decantation or pressing before refining so as to gain better control over the moisture content of the finished product. Different variants of this system have been proposed in which these various steps are differently ordered and alternated.

However, these processes of the prior art do not allow a total removal of the connective tissues and the impurities, such as the skin debris, which have to be removed prior to the manufacture of kamaboko, the main reason being that dry refining does not make it possible to strain the pulp with sufficiently small holes without clogging or without the product warming up. In addition, pressing the pulp causes a significant loss of yield due to a random and imprecise dehydration of the pulp.

A third process, described in document FR 2.651.967, made it possible appreciably to optimize these production methods by carrying out a refining operation in a very wet medium, followed by a centrifugal decantation.

This refining in a wet medium (minimum water content of 92%) has the advantages of:
  removing the "red" muscle containing sarcoplasmic proteins and heat-resistant proteases. In fact, when refining in a wet medium, there is no equilibrium between the fish flesh and the washing medium, and the constituent elements of the flesh react differently. The proteins of the "white" muscle swell and form a product intermediate between a gel and pulp, which can pass through a sieve having perforations in the order of 1 mm, whereas the proteins of the "red" muscle hydrate less and remain firm, preventing passage through the sieve.
  facilitating the dislocation of the structures of the fat cells and consequently improving the removal of the lipids.
  facilitating the removal of the connective tissue fibers and the impurities.

Although this third process is applicable to any type of fish, particularly so-called "oily" fish, in that it affords a better purification of the pulp and a better removal of the pro-oxidizing or denaturing agents, it nevertheless has the disadvantage, in common with all the techniques of the prior art, of causing substantial reductions in the production yields in proportion to the number of washing-centrifugation sequences and the degree of refining.

In summary, the principle of the prior art is above all to look for any means of removing the sarcoplasmic proteins, lipids, pigments and other pro-oxidizing substances and, by removing these elements, to avoid any protein/protein or lipid/protein interaction responsible for the denaturation of the finished product (surimi-base).

BRIEF SUMMARY OF THE INVENTION

The invention proposes a process for the production of surimi-base and other intermediate food products from any type of fish, said process being adaptable according to the nature and specific characteristics of the fish used and according to the desired final quality of the product.

The invention further proposes a process for the production of surimi-base and other intermediate food products particularly from "oily" fish, for which the production yield is improved in relation to the prior art.

To this end the invention relates to a process for the manufacture of hydrated concentrates of myofibrillar proteins from fish flesh, which are commonly known as surimi-base or intermediate food products, said process comprising the following steps in succession:

first of all, an initial pulp of minced fish flesh is prepared from fish fillets;

said initial pulp is then washed with water until the residual fraction of lipids and sarcoplasmic proteins in the washed pulp is between 0.1 and 3% of the weight of the pulp;

the washed pulp is then refined in the wet state by removing a fraction of impurities;

the refined pulp is then mixed until it is in the form of a homogeneous emulsion;

the emulsified pulp is then drained to produce a densified pulp;

cryoprotectants are then added to the densified pulp to form a final pulp suitable for freezing;

the final pulp is then packaged in the form of nutrient blocks;

and said blocks are frozen.

As will become even more clearly apparent below, the invention essentially consists in retaining a certain lipid and protein fraction during the washing and treatment of the fish pulp and in subsequently neutralizing the oxidizing or denaturing potential of these residual lipids and proteins.

According to one preferred mode of carrying out the invention, the pulping operation is coupled with the addition of water. Preferably, the water is added in a ratio of at least one volume of water to three volumes of pulp.

The pulping operation is preferably carried out as a function of a density gradient of the material, making it possible to distinguish between different fractions.

One preferred embodiment of the invention will comprise a washing operation composed of the following steps:

Water is added to the initial pulp and the whole is mixed to form a water-pulp mixture.

The water-pulp mixture is centrifuged and the resulting water is removed.

The centrifuged pulp is washed continuously with water.

Preferably, in the centrifugation step, the volume of water removed is between 80 and 95% of the volume of water initially used.

The mixing operation is preferably carried out continuously until the pulp is in the form of an emulsion with a stability of more than 10 minutes.

In another preferred mode of carrying out the invention, the continuous mixing step is followed by a deodorization of the homogenized pulp in which the latter is evacuated.

In one preferred embodiment of the invention, the operation for draining the emulsified pulp will be carried out by centrifugal decantation.

In another preferred mode of carrying out the invention, the final pulp is subjected to a cold extrusion operation when the cryoprotectants are added.

The invention further relates to an installation for carrying out the process defined above, said installation comprising the following elements successively assembled in series in the order shown:

a pulping device also provided with a waste recovery trough;

a pulp washing device provided with a system for discharging the wash waters;

a pulp refining device provided with a system for discharging the fraction removed;

a continuous pulp mixing device;

a pulp draining device provided with a system for discharging the liquid fraction;

a device for adding cryoprotectants to the pulp;

a device for forming the nutrient blocks;

and a device for freezing the nutrient blocks.

In one preferred mode of carrying out the invention, the pulping device consists of a cylindrical sieve having perforations of different diameter according to a linear gradient ranging from 0.2 to 0.4 mm, and of a variable-pitch endless screw conveyor placed inside said sieve, which is provided upstream with a hopper.

Preferably, the washing device consists of the following in succession:

a refrigerated double-chamber tank equipped with a pipe for the addition of water, if required, and with mixing equipment at the bottom and over the entire height of the tank;

a screen centrifuge;

and a continuous washing device consisting of a refrigerated double-chamber cylindrical tank equipped with a pipe for the addition of water, and with mixing equipment.

Advantageously, the pulp mixing device is a static continuous mixer of the LPD (low pressure drop) type.

In one preferred mode of carrying out the invention, there will also be a deodorization device located behind the continuous mixing device.

Preferably, the pulp draining device is a centrifugal decantation device.

In one preferred mode of carrying out the invention, there will also be a cold extrusion device allowing the addition of cryoprotectants.

Preferably, the cold extrusion device consists of the following in succession:

a conveyor of the hooded screw conveyor type;

a controlled-throughput ram;

and a double-screw extruder equipped with means for monitoring and regulating the pressure.

The invention further relates to the surimi-base obtained by the abovementioned process from oily fish such that its residual fat content is between 0.1 and 1.5%.

Advantageously, the oily fish can be sardine, scad, mackerel or sardinella.

BRIEF DESCRIPTION OF THE FIGURES

The various essential points on which the invention is based will be taken individually and explained below, but the invention will first be clearly illustrated by means of the description of the following example given with reference to the attached plates of drawings, in which.

DETAILED DESCRIPTION OF THE INVENTION

Figure 1:
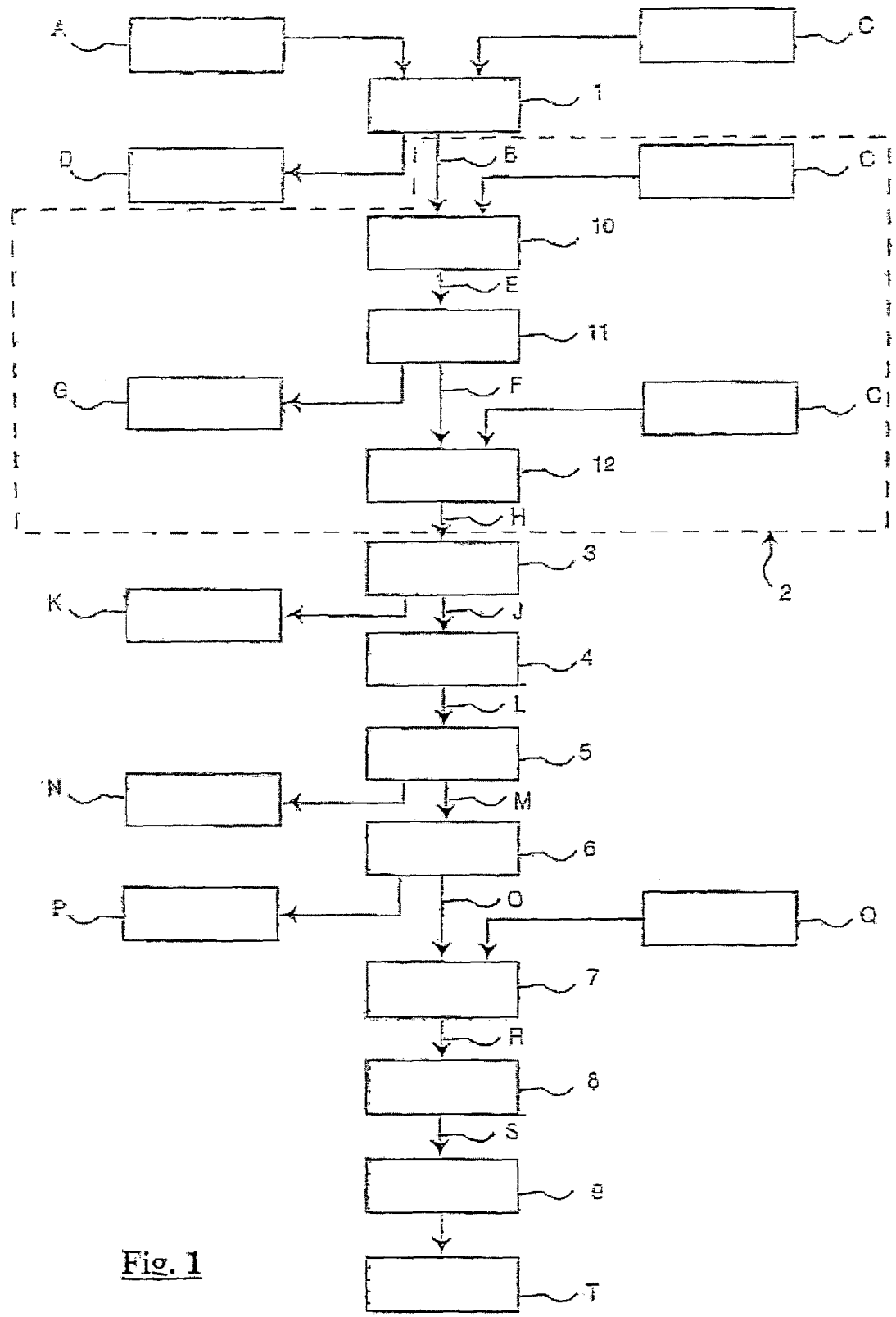
FIG. 1 is a block diagram showing the flow sheet of the treatment according to the invention.
Figure 2:
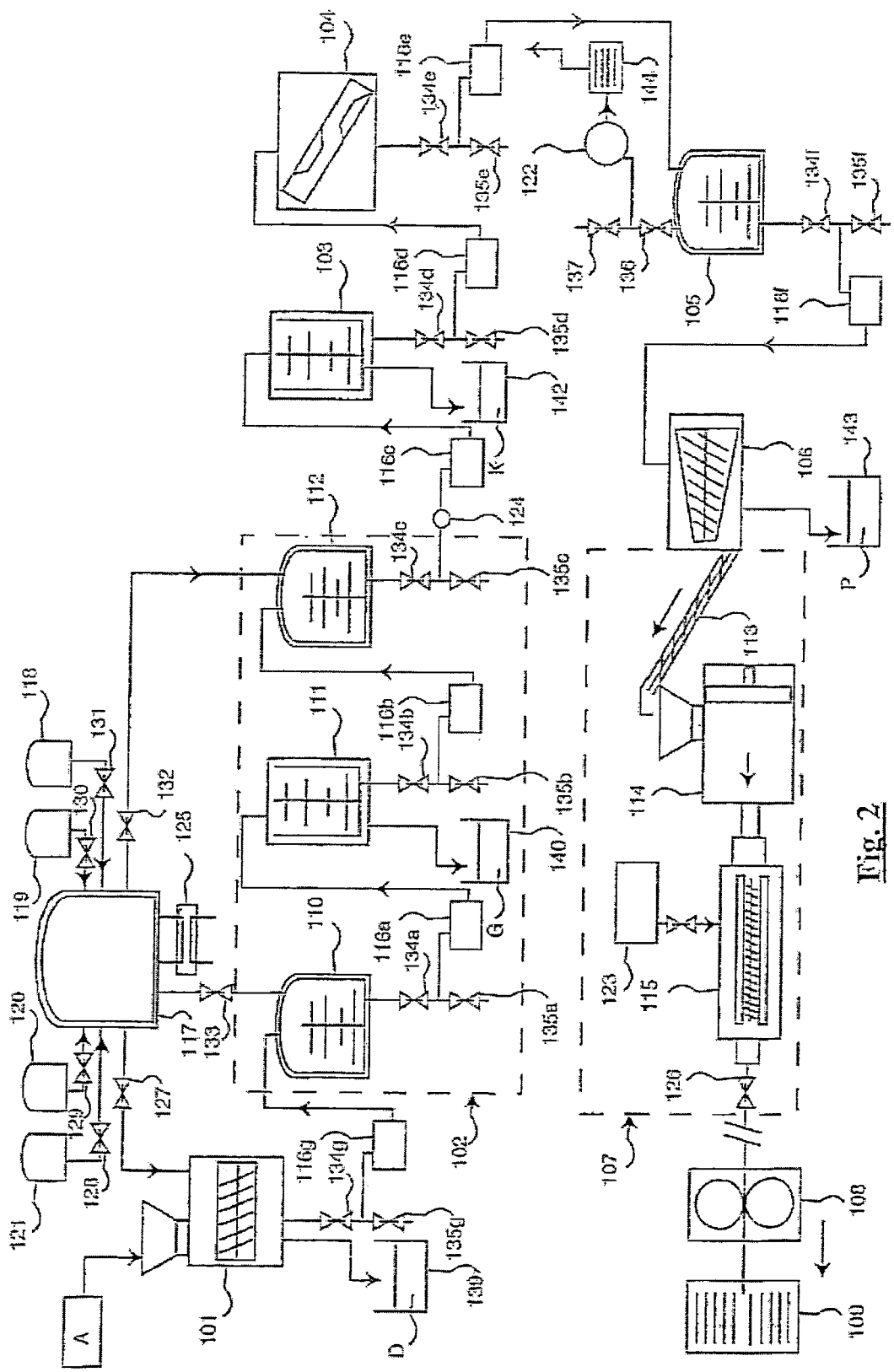
FIG. 2 is a diagram of the installation for carrying out the invention.

The process will now be described with reference mainly to FIGS. 1 and 2 (unless expressly indicated otherwise), observing the chronological order of the constituent operating steps (or phases). It is applicable to any type of fish (oily or non-oily, freshwater or seawater) at any period of its natural cycle.

Phase 1: Pulping (1)

The pulp is obtained by means of a pulper 101 in which the material is subjected to a gradual linear separation as a function of a density gradient along a drum having several perforation diameters. This separation as a function of density and texture makes it possible to optimize the separation of the muscle tissues from the subcutaneous adipose tissues and from the bones and skin.

The headed and gutted fish A (without peritoneum), filleted- or non-filleted, is introduced into a hopper and taken up by a variable-pitch endless screw conveyor inside a cylindrical sieve having perforations ranging from 0.2 to 0.4 mm. A gradual separation of the constituent elements of the material introduced is obtained as a function of the density of the tissues, the diameter of the perforations and the compression stresses generated by the endless screw. One or more fractions of material will be retained according to the quality specifications applied to the finished product (surimi-base—intermediate food product).

Again in contrast to the prior art, this step is followed by the addition of process water C immediately at the outlet of the rotating sieve in proportions of 1 to ⅓ (⅓ volume of water to 1 volume of pulp) by means of a valve 127. This immediate addition of water improves the solubilization of the sarcoplasmic proteins, whose dilutability is optimal as from the first few seconds of mixing of the pulp.

The process water will be prepared in a double-chamber tank 117 from the purest possible fresh water, whose hardness will be adjusted to 13° H (French degrees of hardness)—equivalent to 130 mg/l of calcium carbonate—and its temperature will be in the order of 5° C. The pH of the process water may be adjusted so that the fish pulp remains as neutral as possible and so that the natural oxidation phenomena occurring after the rigor mortis phase of the fish can be counteracted.

A device consisting of a tank 118 and a metering valve 131 supplies the fresh water. A device consisting of a tank 119 and a metering valve 130 enables the salinity of the process water to be regulated. A device consisting of a tank 120 and a metering valve 129 enables the pH of the process water to be regulated. A device consisting of a tank 121 and a metering valve 128 enable the concentration of conditioning agent in the process water to be regulated. The temperature of the process water is maintained at 5° C. by means of a plate exchanger 125.

This technique allows a continuous mechanized treatment without the individual fish fillets being introduced manually into the pulping machine, which, to the knowledge of the Proprietors, was not possible in the prior art.

When this step is complete, the pulp B, with added water, is recovered by means of a pump 116g, and a waste fraction D is discarded into a storage trough 139. The pump 116g is associated with a flow regulating valve 134g and a discharge valve 135g.

Phase 2: Washing (2)

The washing operation has to allow the retention of a given fraction of lipids and sarcoplasmic proteins of 0.1 and 3% of the total weight of the pulp. It is carried out by means of a washing device 102. This washing device 102 is associated downstream with a device 124 for measuring the residual lipid content, which consists of an online sensor or a unit that takes samples for laboratory analysis. According to the invention, the washing operation proceeds in three steps:

Step 1: Washing by Mixing and Buffer Storage (10)

The pulp B is introduced into a refrigerated double-chamber tank 110 equipped with a mixing device at the bottom of the tank and over the entire height of the tank.

Process water C, whose physicochemical characteristics are identical to those of the process water of phase 1, is added until a proportion of one volume of water (R1) to one volume of pulp (ratio 1:1) is reached.

The product is mixed at a speed of 20 to 90 rpm for a period not exceeding ½ hour. The duration of this washing/buffer storage depends on the initial quality of the product.

Step 2: Centrifugation (11)

The water-pulp mixture E is pumped continuously by means of a pump 116a is introduced into a screen centrifuge 111. The pump 116a is associated with a flow regulating valve 134a and a discharge valve 135a.

The pulp passes into a perforated cylindrical sieve (diameter of perforations 0.5 mm), where it is centrifuged by a system of rotating blades. Preferably, the equipment should operate according to the test bench standards to give the following results: flow rate of 300 to 400 l/hour for a sieve of diameter 20 cm and length 25 cm and for a blade rotation speed of 250 rpm.

The water G, charged with soluble proteins and fats, passes through the sieve and is discarded by means of a discharge device 140. Preferably, the amount of water recovered (R2) should be adjustable to a value of between 80 and 95% of the initial amount added in phase 1 and step 10, i.e. on average $R2 = 90\% \times R1$.

Step 3: Continuous Washing (12)

The centrifuged pulp F is transported by means of a pump 116b to a refrigerated double-chamber cylindrical tank 112 (refrigeration is omitted if there is no observed temperature increase under the specific use conditions) equipped with a mixing device preferably consisting of cylindrical fingers of diameter 2.5 cm, whose length is such as to allow a 0.5 to 1 mm gap between the blades and the skirt. The pump 116b is associated with a flow regulating valve 134b and a discharge valve 135b.

Process water C is added until the volume is preferably equal to R3 (=R1+R2).

Preferably, the mixing is effected at a variable speed of 30 to 200 rpm. This washing operation is continuous.

Phase 3: Refining (3)

The washed pulp H, with added water (moisture content between 88 and 95%), is transferred to a refiner 103 by means of a pump 116c. The pump 116c is associated with a flow regulating valve 134c and a discharge valve 135c.

The pulp passes into a perforated cylindrical sieve (diameter of perforations 1 mm), where it is centrifuged by a system of blades rotating at high speed. The pulp is forced through the sieve. The most solid parts remain inside the sieve and are discarded. Preferably, the equipment should operate according to the test bench standards to give the following results: flow rate of 100 l/hour for a sieve diameter of 14 cm and length of 19 cm and for a blade rotation speed of 1000 to 1500 rpm.

The priority function of this refining is to remove the connective tissue fibers and the residual skin debris. The variation in centrifugation speed makes it possible gradually to remove all or part of the red muscles present in the pulp. The final lipid concentration is adjusted in this step.

The waste fraction K is discarded through a discharge device 142.

Phase 4: Continuous Mixing (4)

The refined pulp J is introduced under low pressure by means of a pump 116d into an online static mixer 104 composed of mixing elements of the LPD (low pressure drop) type. The pump 116d is associated with a flow regulating valve 134d and a discharge valve 135d.

This static mixer consists of one or more tubes having internal baffles (two semi-elliptical diaphragms intersecting at the center at an angle of 90°) arranged so as to allow homogeneous mixing of the pulp (emulsion stability more than 10 minutes). The mixing is based on division and transverse deflection of the fluid. For laminar flow, the number of subdivisions L generated by E elements with N components to be mixed is given by the formula $L=N(2)^E$. For turbulent flow, the elements accentuate the accidental dispersion of the microfluxes. This mixing allows a rapid diffusion of the soluble proteins and a mechanical separation of the fats, which end up in a stable aqueous emulsion.

This emulsion makes it possible to microencapsulate the denaturing elements, such as the lipids, within the protein matrix and prevents any interaction between the constituents of the mixture.

Phase 5: Deodorization and Evacuation (5)

The stable emulsion of fish pulp L is transferred by means of a pump 116e to a deodorization device 105 consisting of a refrigerated double-chamber tank connected to a vacuum pump 122 for obtaining a pressure reduction of at least 0.8 bar, and equipped with a slow mixing system (20 to 90 rpm). The pump 116e is associated with a flow regulating valve 134e and a discharge valve 135e. The vacuum pump 122 is associated upstream with a flow regulating valve 136 and a discharge valve 137 and downstream with a filter 144.

Evacuation makes it possible to remove the volatile compounds N which, in the prior art, are responsible for the residual flavor of the finished product (surimi-base).

Phase 6: Centrifugal Decantation (6)

The homogenized and deodorized fish pulp M is transferred by means of a pump 116f to a constant-flow centrifugal decanter 106 consisting of a cylindro-conical bowl housing a screw conveyor. The pump 116f is associated with a flow regulating valve 134f and a discharge valve 135f.

The product to be treated is introduced into the feed chamber of the rotating assembly by means of a fixed feed pipe located in the axis of rotation of the bowl. This chamber allows a uniform distribution of the product.

Under the action of the centrifugal force, the solid phase is flung against the wall of the bowl. The solids are transported by the screw conveyor to the conical part of the bowl, where they are extracted from the liquid phase and discharged continuously towards the next step. The clarified liquid P (waste) is discharged by overflowing through orifices located at the cylindrical end of the bowl, and then discarded by means of a discharge system 143.

The objective is to reduce the moisture content of the product to within a range of 74-84%.

Phase 7: Addition of Cryoprotectants and Cold Extrusion (7)

The decanted pulp O is taken up by means of a hooded screw conveyor 113, or by pumping, and introduced into a cold extruder 115 with co-rotating twin screws.

The extruder 115 is fed with pulp by a controlled-throughput ram 114 which meters a precise weight. A back pressure valve 126 is advantageously placed at the outlet of the extruder 115 for varying the extrusion parameters. According to the invention, the conveyor 113-ram 114-extruder 115-back pressure valve 126 assembly constitutes the cold extrusion device 107.

A device 123, associated with a metering valve 138, makes it possible to add three pulverulent cryoprotectant additives Q in the following proportions: sugar: 4%; sorbitol: 4%; polyphosphate: 0.1%.

The pulp is carried along by a double screw over which transfer, mixing and shear elements are distributed to produce an optimal disorganization of the muscle fibers and give the finished product (surimi-base) its gelling properties.

The objective of this microdestructuring, apart from allowing intimate mixing with the cryoprotectants, is to increase the number of potential protein reattachment sites by forming a continuous and ordered three-dimensional protein network.

This extrusion phase should be executed under controlled temperature conditions so as to avoid both a denaturation of the proteins and a solidification of the pulp in the extruder barrel.

Phase 8: Forming of the Blocks (8)

The pulp R is recovered continuously at the outlet of the extruder and introduced into a block forming device 108, where it is formed into blocks S of thickness 5 to 10 cm and weight 10 or 20 kg, and then packaged in opaque polyethylene bags.

Phase 9: Freezing (9)

The packaged blocks S will be cooled as quickly as possible after extrusion (with a delay of not more than 30 minutes at 4° C.) to a temperature below −5° C. so that the product preserves all its properties. The preferred freezing device 109 will operate by contact freezing. The frozen blocks of surimi T are now ready to use.

By way of example, such a production installation will have an input of 1400 kg per hour of fish fillets and an output of 720 kg per hour of ready-to-use packaged surimi.

Another example is given in the Table below, which follows the weight of the different phases (oil, solid, water) contained in the material throughout the process according to the invention. The 2400 kg of fish fillets initially introduced were obtained from 4000 kg of whole fish. The production rate is 2400 kg of fillets introduced per hour. This example does not include the deodorization phase (5).

|  | Oil (kg) | Water (kg) | Solid (kg) | Total (kg) |
| --- | --- | --- | --- | --- |
| Introduction of 2400 kg of fillets | 288 | 1752 | 360 | 2400 |
| Mixing (10): Addition of 2400 kg of water | 288 | 4152 | 360 | 4800 |
| Centrifugation (11): Removal of 2160 kg of wash water | 15 | 2380 | 245 | 2640 |
| Continuous washing (12): Addition of 4500 kg of water | 15 | 6880 | 245 | 7140 |
| Refining (3): Removal of 1345 kg of water and impurities | 13 i.e. 0.2% | 5573 | 209 | 5795 |
| Continuous mixing (4): Emulsification | — | 5573 | 222 | 5795 |
| Centrifugal decantation (6): Removal of 4685 kg of liquid | — | 900 | 210 | 1110 |
| Extrusion (7): Addition of 90 kg of cryoprotectants | — | 900 i.e. 75% | 300 i.e. 25% | 1200 |

It is seen that the retention of 0.2% of oil after the refining operation (3), and its incorporation into the solid phase by microencapsulation in the protein network through emulsification, ultimately produces 1200 kg of surimi. This amounts to a yield of 30% based on the weight of fish used, or 50% based on the weight of fillets introduced.

It is self-evident that these examples do not imply a limitation. Thus, the deodorization (5) of the pulp is a preferred mode of carrying out the invention, but can be omitted. Likewise, the cold extrusion (7) of the pulp is not essential to the implementation of the invention. A simple addition of cryoprotectants in conventional manner is also possible. The pulping (1) can also be carried out in conventional manner. Likewise, the washing (2) of the pulp can be effected by other means provided that it enables the aforementioned fraction of between 0.1 and 3% of lipids and sarcoplasmic proteins to be retained. Finally, the pulp draining operation (6) can be effected by pressing the pulp.

As already stated, the special feature of the invention is based on two essential points which are now described in detail below and which, if observed conjointly, afford the industrial production of nutriment under satisfactory economic conditions from "oily" fish of low commercial value.

1—Controlling the Oxidation and Denaturation Phenomena

The phenomena of denaturation and oxidation of the myofibrillar proteins by the lipids or sarcoplasmic proteins are due to lipid/protein or protein/protein interactions. The process according to the invention makes it possible firstly to limit the occurrence of these phenomena, and secondly to neutralize the elements that cause them.

The denaturation and oxidation of the myofibrillar proteins usually starts with the pulping operation. According to the invention, a volume of water equivalent to at least a third of the volume of pulp used is added to the pulp at the same time as the pulping operation with the aim of solubilizing the sarcoplasmic proteins as soon as possible and thereby limiting their oxidizing and denaturing action.

In conventional manner, the process water used throughout the process according to the invention, and therefore during the pulping operation, will be of high purity and at a temperature of between 0 and 10° C. Those skilled in the art will be able to adjust its pH so that the pulp remains as neutral as possible.

The residual lipids and sarcoplasmic proteins are then neutralized during the continuous mixing step—Phase 4. Intimate mixing of the pulp, with added water, during this operation will allow rapid diffusion of the water-soluble proteins and mechanical separation of the lipids, which form a stable aqueous emulsion. These elements are thus microencapsulated within the protein matrix. As any interaction between the constituents of the mixture is prevented, the oxidation and denaturation phenomena are neutralized.

Controlling these phenomena will make it possible to obtain a high-quality surimi throughout the year, irrespective of the specific characteristics of the fish used; this was not possible with the prior art. It will also make it possible to retain a residual fraction of lipids and sarcoplasmic proteins in the surimi-base and thereby to improve the production yield, especially when the process is applied to the production of surimi-base from oily fish.

2—Managing the Purification of the Pulp

As noted previously, the objective of the prior art was to remove all, or at least as much as possible, of the sarcoplasmic proteins, lipids and impurities.

As will be seen, the invention makes it possible to remove the impurities and odoriferous compounds while at the same time controlling the removal of the lipids and sarcoplasmic proteins. The invention makes it possible to retain a greater or lesser fraction of these elements according to the quality grade intended for the finished product.

According to the invention, removal of the unwanted elements starts with the pulping operation—Phase 1.

In the process according to the invention, a gradation in the diameter of the sieve perforations is such that it is possible to distinguish between different fractions in the pulping operation according to the density of the material. This device has three major advantages.

Firstly, the recovery of the product can be optimized according to the intended quality grade. In other words, the choice can be made to retain one or more of the fractions of material according to the initial quality of the crude product.

Secondly, the impurities, such as the bones or skin, will be removed more efficiently since they are obtained at the end of the separation run, making it possible to improve the quality of the final product (whiteness of the surimi).

Finally, the fish fillets no longer need to be introduced manually because this can be done by a continuous mechanized method using a hopper.

The pulp will then be washed and refined. It will be possible to adjust the residual content of lipids and sarcoplasmic proteins by regulating the centrifugation parameters during the washing and refining.

Thus, during the centrifugation step (11), between 80 and 95% of the initial amount of water used will be removed. This first choice allows a first adjustment of the final content of lipids and proteins. The centrifugation step (11) according to the invention becomes one of the regulation points for the final quality of the product.

The final content of lipids and sarcoplasmic proteins will be adjusted during the refining operation (Phase 3), this refining being effected on a pulp whose moisture content will have been chosen according to the intended quality grade by means of the separation mechanisms explained above. In the process according to the invention, the refining operation no longer serves only to wash the pulp; it becomes one of the regulation points for the quality of the final product. At this stage, the objective of the invention is to retain a given fraction of these lipids of between 0.2 and 1.5% of the total weight.

As has been seen, the process according to the invention affords a good removal of the impurities, providing those skilled in the art with a product having good characteristics while at the same time enabling them to retain a greater or lesser proportion of lipids and sarcoplasmic proteins whose oxidizing and denaturing capabilities have been neutralized. To the Applicant's knowledge, neither this flexibility of the process, allowing adaptation to the nature and specific characteristics of the fish used and to the desired final quality of the product, nor the voluntary retention of lipids and sarcoplasmic proteins, is to be found in the prior art.

Figure 3:
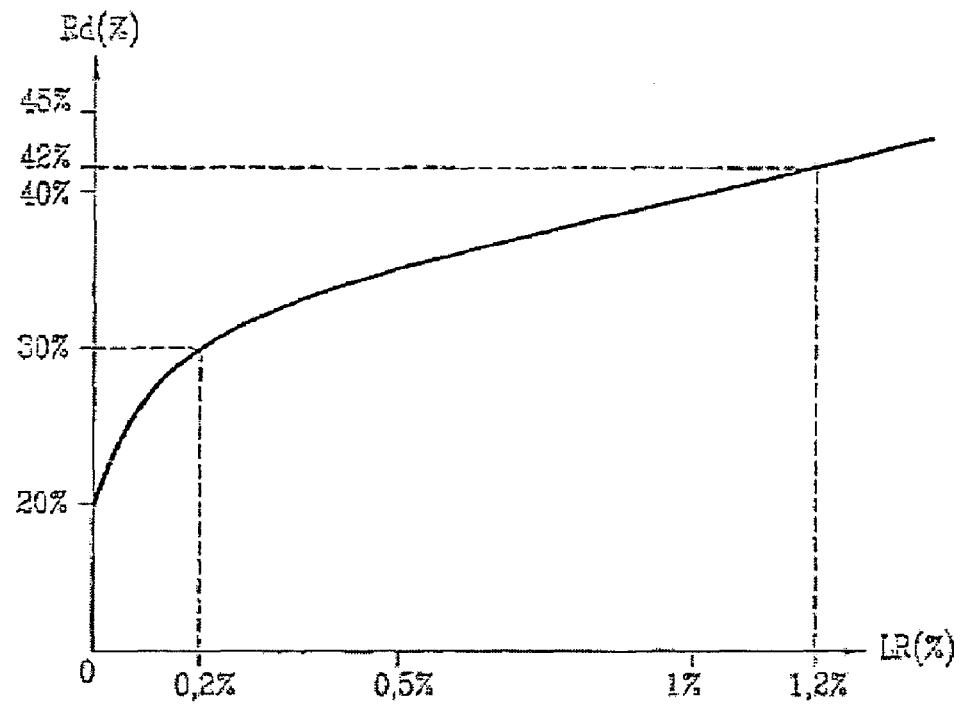
FIG. 3 is a curve showing the variation in the production yield (Y) of sardine surimi-base from whole fish (percentages by net weight) as a function of the percentage of residual lipids (RL) microencapsulated within the protein matrix.

It will be seen in FIG. 3 that a yield of 30% is obtained for 0.2% of microencapsulated lipids and a yield of 42% is obtained for 1.2% of microencapsulated lipids.

Figure 4:
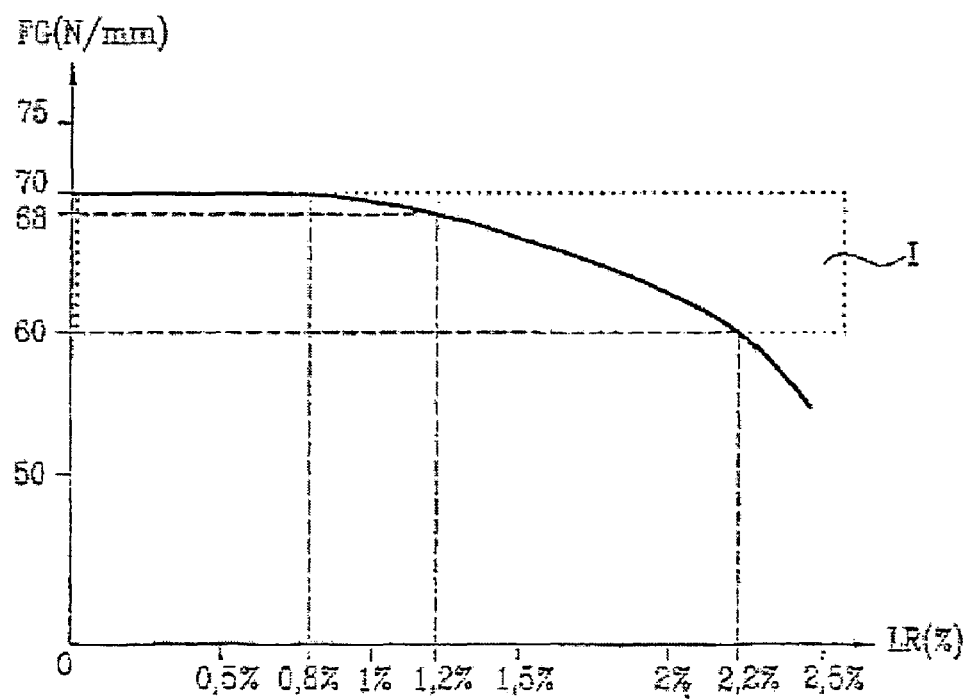
FIG. 4 is a curve showing the variation in the gelling strength gradient (GS) of the sardine surimi-base as a function of the percentage of residual lipids (RL) microencapsulated within the protein matrix.

Likewise, it will be seen in FIG. 4 that, up to a lipid content of 0.8%, there is no effect on the gelling strength of the surimi. It will be noted that high-quality gels are still obtained up to a content of 2.2% (boxed zone I in the Figure). The gelling strength gradient for 1.2% of microencapsulated lipids is 68 $N.mm^{-1}$.

Apart from the major characteristics and advantages which have now been described, the invention offers further advantages, especially in terms of the quality of the surimi produced.

For example, one of the advantages of the invention as regards the quality of the surimi produced is that it comprises an additional step, namely evacuation of the pulp—Phase 5—for specific removal of the volatile compounds that are responsible in the prior art for the flavor of the product.

Another example relates to the criteria which the surimi-base has to satisfy in respect of the gelling strength and the quality of the gel that it will form after cooking.

Here again, the invention enables the quality of the surimi-base produced to be improved by carrying out a cold pulp extrusion operation—Phase 7—at the end of the process.

Under the effect of the intense shear generated inside the extruder, the native proteins will dissociate into monomers. The polypeptide chains will unfold and expose the reactive groups that are the focal point of hydrophobic reactions and the creation of disulfide bridges responsible for the organization of the proteins into a continuous and ordered three-dimensional network.

Cold extrusion therefore makes it possible to improve the capabilities of the surimi-base to form a stable gel by increasing the number of reattachment sites for the myofibrillar proteins, and to compensate for any degradation of these properties which the presence of residual lipids might have generated.

Finally, the extrusion operation means that no salt (or only a little salt) is required for protein reattachment, reducing the degradation of the pulp and enabling a smaller amount of cryoprotectant additives to be used.

Another advantage concerns the amount of water required for carrying out the process. The processes of the prior art need several successive additions of water, with the result that up to five volumes of water are used to treat one volume of pulp. Some traditional techniques for processing oily fish can even result in the use of seven volumes of water for one volume of pulp. In the process according to the invention, three volumes of water will be used for one volume of pulp, thereby reducing the production costs.

Another advantage of the process according to the invention is that it can run totally continuously from the introduction of the fish fillets into the pulper up to the forming of the blocks.

As already emphasized, the invention is preferentially applied to the field of the industrial production of surimi-base from "oily" fish. However, it is of course still applicable in a general manner to the production of surimi-base, or any other intermediate food product, from any species of fish.

It is self-evident that the invention cannot be limited to this example but that it covers a multiplicity of variants or equivalent processes subject to compliance with the definition of the invention given in the attached claims.

The invention claimed is:

1. A process for the manufacture of intermediate food products in a form of hydrated concentrates of myofibrillar proteins from fish flesh, said process comprising the following steps:
    preparing an initial pulp of minced fish flesh from fish fillets;
    washing said initial pulp with water;
    adjusting pH of said water to maintain said pulp at substantially neutral pH throughout the process;
    said washed pulp is refined in the wet state by removing a fraction of impurities;
    the refined pulp is mixed until it is in a form of a homogeneous emulsion;
    the emulsified pulp is drained to produce a densified pulp;
    cryoprotectants are added to the densified pulp to form a final pulp suitable for freezing;
    the final pulp is packaged in a form of blocks; and
    said blocks are frozen,
        washing said initial pulp to obtain a washed pulp containing a residual fraction of lipids and sarcoplasmic proteins comprised between 1.2 and 3% of the weight of the pulp.

2. The process as claimed in claim 1, wherein said preparing is coupled with addition of water.

3. The process as claimed in claim 2, wherein the water is added in a ratio of at least one volume of water to three volumes of pulp.

4. The process as claimed in claim 1, wherein said preparing is carried out as a function of a density gradient of the fish fillets.

5. The process as claimed in claim 1, wherein said washing includes the following steps:
    water is added to the initial pulp and the whole is mixed to form a water-pulp mixture;
    the water-pulp mixture is centrifuged and the resulting water is removed;
    and the centrifuged pulp is washed continuously with water.

6. The process as claimed in claim 5, wherein in the centrifugation step, a volume of water removed is between 80 and 95% of a volume of water initially used.

7. The process as claimed in claim 1, wherein the mixing operation is carried out until the homogenized pulp is in a form of an emulsion with a stability of more than 10 minutes.

8. The process as claimed in claim 1, wherein the mixing step is followed by a deodorization of the emulsified pulp in which the latter is evacuated.

9. The process as claimed in claim 1, wherein the operation for draining the emulsified pulp is carried out by centrifugal decantation.

10. The process as claimed in claim 1, wherein the final pulp is subjected to a cold extrusion operation during addition of cryoprotectants.

11. The process as claimed in claim 2, wherein the pulping operation is carried out as a function of a density gradient of the fish fillets.

* * * * *